United States Patent [19]
Bertrand et al.

[11] Patent Number: 5,415,534
[45] Date of Patent: May 16, 1995

[54] APPARATUS FOR PRODUCTION OF LAYERED EXTRUDED ARTICLES

[75] Inventors: Francis-Victor Bertrand, Laversines; Alain Daouse, Noailles; Alain Plessier, Bresles, all of France

[73] Assignee: Nestec S.A., Vevey, Switzerland

[21] Appl. No.: 188,949

[22] Filed: Jan. 28, 1994

Related U.S. Application Data

[62] Division of Ser. No. 779,885, Oct. 21, 1991, Pat. No. 5,283,070.

[30] Foreign Application Priority Data

Nov. 15, 1990 [EP] European Pat. Off. ............ 90121854

[51] Int. Cl.⁶ .................................................. A23L 1/48
[52] U.S. Cl. ...................................... 425/104; 425/99; 425/100; 425/150; 425/375; 425/381; 425/461; 118/14; 118/24; 118/25
[58] Field of Search ............... 425/94, 98, 99, 100, 425/104, 105, 150, 257, 261, 713, 134, 375, 461, 110, 381, 91, 92, 97, 382.3; 118/14, 24, 25

[56] References Cited

U.S. PATENT DOCUMENTS

| | | |
|---|---|---|
| 2,190,226 | 2/1940 | Alexander . |
| 2,284,651 | 6/1942 | Gundlach et al. . |
| 2,334,052 | 11/1943 | Wedin . |
| 2,347,083 | 4/1944 | Connellee et al. . |
| 2,392,698 | 1/1946 | Russell . |
| 2,646,757 | 7/1953 | Hackmann . |
| 2,689,537 | 9/1954 | Peyton . |
| 2,774,314 | 12/1956 | Moser . |
| 3,908,867 | 9/1975 | Raitt . |
| 4,189,289 | 2/1980 | Getman .................... 425/100 |
| 4,504,511 | 3/1985 | Binley . |
| 4,758,143 | 7/1988 | Lopes ....................... 118/25 |
| 4,793,279 | 12/1988 | Grenier ..................... 118/25 |
| 4,873,104 | 10/1989 | Butcher et al. . |
| 4,913,645 | 4/1990 | Daouse et al. . |
| 4,923,706 | 5/1990 | Binley et al. . |
| 5,081,917 | 1/1992 | Masuda .................... 118/14 |
| 5,135,767 | 8/1992 | Daouse . |
| 5,322,432 | 6/1994 | Grieje .................... 425/99 |

FOREIGN PATENT DOCUMENTS 0221757  5/1987  European Pat. Off. .
0322469  7/1989  European Pat. Off. .

*Primary Examiner*—Khanh Nguyen
*Attorney, Agent, or Firm*—Vogt & O'Donnell

[57] ABSTRACT

An apparatus for production of a layered extruded article has an extrusion nozzle positioned for extruding an extrudable composition in a vertical downward direction. The nozzle has a fixed upper part, a joint member and a lower mobile part having a slot extrusion die. The joint member connects the upper and lower parts so that the lower part is rotatable about a central vertical axis of the lower part so that upon rotation of the lower part and extrusion of the extrudable composition, a helical ribbon is formed. A spray nozzle is positioned for spraying a sprayable composition into the passage of the helical ribbon between helical peak flights, and a support, which may be advanced continuously or step-by-step, is positioned beneath the extrusion and spray nozzles for receiving the sprayed, extruded composition.

7 Claims, 3 Drawing Sheets

5,415,534

APPARATUS FOR PRODUCTION OF LAYERED EXTRUDED ARTICLES

CROSS REFERENCE TO RELATED APPLICATION

This application is a divisional application of application Ser. No. 07/779,885, filed Oct. 21, 1991, now U.S. Pat. No. 5,283,070.

BACKGROUND OF THE INVENTION

This invention relates to a process and an apparatus for the production of an aerated dessert article, more particularly a mousse or an article of ice confectionery containing flakes of crispy composition within its mass.

In the field of articles of ice confectionery, whether in the form of block portions, such as gâteaux or containers, or in the form of individual portions, such as stick ices, ice lollies, cones, rolls, tubs and the like, there are articles containing flakes of chocolate distributed within the ice cream mass.

With a view to producing new textures, consumers have been offered articles of ice confectionery containing thin layers of crispy material to provide them with a flaky texture.

Thus, according to European Patent Application No. 322 469, such articles as flaky stick ices or cones are produced by successive formation of layers of ice cream and thin layers of chocolate by partial freezing of the ice cream at its periphery, removal of the central, still liquid part under suction, spraying of chocolate into the cavity thus formed and filling of the central part with ice cream. Because of production constraints, the articles obtained contain only a relatively small number of thin, crispy, longitudinal layers continuous in revolution.

According to European Patent Application No. 221 757, ice cream cones or stick ices containing thin chocolate chips within their mass are produced by forming longitudinal grooves in a vertically extruded strand of ice cream by means of deflectors and filling the grooves thus formed with chocolate, the veins of chocolate which solidify on contact with the ice cream breaking randomly into chips when the strand is folded double to fill the mould. However, this process is attended by the disadvantage that, because they are cooled from outside on contact with the ice cream, the deflectors in the form of chocolate feed tubes can become blocked by solidification of the chocolate inside the tubes.

According to U.S. Pat. No. 2,190,226, more particularly the embodiment shown in FIG. 5, chocolate is introduced by spraying through an annular nozzle into the interstices between veins of ice cream produced by extrusion through a ring-shaped nozzle provided with radially arranged slot dies, the whole is made to converge by gravity into a vertical flow in a funnel and is then discharged under pressure into an elbow tube which produces flakes of chocolate uniformly distributed within the ice cream mass. The object of this arrangement is to solidify the chocolate in the form of thin separate particles on contact with the ice cream and to mix these particles uniformly with the mass of ice cream.

These last two processes do not provide the required result. This is because the texture obtained is not the same as that which would be obtained if the thin layers of chocolate were to form substantially continuous flakes. It has in effect been found that it was a really pleasant sensation to chew through thin, contrasting and clearly discernible layers of soft material and crispy material.

SUMMARY OF THE INVENTION

The problem addressed by the present invention was to provide an aerated dessert article of the above-described type containing a large quantity of flakes of crispy composition arranged transversely in the form of substantially continuous ribbons by a process and a simple apparatus suitable for high-output production.

The process according to the present invention comprises extruding an aerated ice composition into a vertically descending helix rotating about a vertical axis and having spaced flights which define passages therebetween in the helix, spraying a second composition selected from the group consisting of fat-based, water-based and sugar-containing compositions into passages of the rotating helix, and depositing the sprayed helix so that a layered product having alternating layers of aerated ice composition and second composition is formed. In one embodiment, the aerated ice composition is extruded through a rotating nozzle positioned above a support and the second composition is sprayed onto the helix through a fixed nozzle positioned between the rotating nozzle and the support.

An apparatus according to the present invention comprises an extrusion nozzle which is positioned for extruding an extrudable composition in a vertical downward direction and which comprises a fixed upper part, a joint member and a lower mobile part having a slot extrusion die, wherein the fixed upper part is positioned for receiving an extrudable composition, the lower mobile part is positioned for receiving the composition from the upper part and for extruding the extrudable composition through a slot of the slot extrusion die, and the joint member connects the upper and lower parts so that the lower part is rotatable about a central vertical axis of the lower part so that upon rotation of the lower part and extrusion of the extrudable composition, the extruded composition has a form of a helical ribbon having a passage between helical peak flights, and the apparatus further comprises means for rotating the lower part, a spray nozzle positioned for spraying a sprayable composition into the passage of the helical ribbon, a support positioned beneath the extrusion and spray nozzles for receiving the sprayed, extruded composition, and means for advancing the support beneath the nozzles.

DETAILED DESCRIPTION OF THE INVENTION

In the context of the invention, the expression "slot die" is understood to mean that the outlet orifice of the nozzle is distinctly more elongate than wide. The shape of the slot is not confined to a rectangle, but may have several branches, for example in the form of a star with three points symmetrical in relation to the axis of the nozzle, or in the form of a cross. The "branches" of the slot may be slightly curved, for example the slot may assume a flat S shape. Alternatively, the die may comprise several separate closely adjacent, rectangular or curved slots disposed symmetrically in relation to the axis of the nozzle, for example in the shape of a star or parallel and offset. Accordingly, the cross-section of the ribbon of ice confectionery issuing from the nozzle is dependent on the shape of the die. For example, if the die is a slot in the form of a star with three points, the ribbon will have three sides on leaving the nozzle.

Because the nozzle rotates about its own axis and because the mould remains stationary during filling or because of the high speed of rotation of the nozzle relative to the speed of travel of the support, the ribbon coils into the shape of a helix.

The term "crispy composition" applies to a fat-based composition containing fats having a pour point above 0° C. and, more particularly, above room temperature. The fat may be a vegetable butter, such as cocoa butter, a cocoa butter substitute or equivalent, more particularly a fat based coating of the type commonly used in confectionery. It may also be a water-based or sugar-containing composition, for example a cooked sugar. A fat-based, water-based or sugar-based composition may contain flavourings or colourants. The composition should be liquid so that it may be applied in the form of a thin layer by spraying and becomes sufficiently hard and fragile on contact with the cold aerated composition. It should have good spreading properties. It is preferably thin enough to break with small crackles when chewed and, in practice, should be less than 1 mm thick and, more particularly, less than 0.5 mm thick.

The aerated composition is an aerated ice composition, for example an aerated ice cream or sorbet, or an aerated refrigerated or iced mousse, for example based on aerated cheese or cream, having a soft texture.

According to the invention, the crispy composition is projected laterally from a nozzle surrounding the helix without touching it. The projected flows must be such that they converge from the outside towards the passages of the helix, i.e., the channel-like surfaces situated between the peaks, and the crispy composition applied to those surfaces penetrates into the mass of aerated composition under the effect of the centrifugal force created by the rotation of the nozzle.

The process according to the invention is suitable for the production of dessert articles of small to medium volume placed in optionally edible moulds, for example in the case of ice cream cones, filled intermittently with successive doses. The process according to the invention is particularly suitable for the production of ice cream cones where the mould is formed by a cornet wafer, preferably coated internally with a thin layer of a fat-based material acting as a moisture barrier. To make articles of this type, the wafers are placed in holes formed in plates fixed to a chain. The chain advances step-by-step and may form part of a linear installation or a carousel. The wafer cones are thus presented to the filling unit and remain stationary during filling. Thus, a cycle is divided substantially equally between the time required to displace the mould and the time required to fill the mould. According to the invention, it is possible to complete 45 to 65 cycles per minute, which is a remarkably high output for the complex articles in question. For an output rate such as this, the rotary nozzle rotates permanently at around 100 to 200 revolutions per minute.

The process according to the invention is also suitable for applying a flaky aerated composition of the type described above as a finishing decoration of an article, for example a cornet or a tub which, previously, will have been partly filled with an aerated composition of another type. Alternatively, the flaky aerated composition may be placed at the bottom of a mould and may be covered with an aerated composition of a different type. The flaky aerated composition may also form the centre of a larger article, for example a tub or a container, and may thus be surrounded by an aerated composition of a different type.

Finally, a flaky iced aerated composition may be deposited in the form of a continuous helical ribbon, for example as decoration, to a continuous strand of rectangular cross-section passing beneath the nozzles or as a filling in a continuous strand of U-shaped cross-section. A strand of the type in question may be an article of ice confectionery and/or cake, for example Genoese cake. After the decoration or filling has been applied, the whole may be cut into portions to form a gâteau.

In one particular embodiment intended for filling a mold, the apparatus of the present invention comprises means for imparting a step-by-step translatory movement to the mould so that the mould remains stationary during filling and means for interrupting the supplies of ice confectionery and crispy composition between fillings.

In one preferred embodiment, the spray nozzle for the crispy composition is in the form of a ring formed with orifices which are directed downwards and towards the axis of the ring and which are distributed at regular intervals around the ring. The orifices may differ in diameter. For example, the annular nozzle may have 6 to 12 orifices between 0.5 and 1 mm in diameter. The crispy composition may also be projected through slots of different length and width. The ring may be replaced by individual nozzles distributed around and below the rotary nozzle although this is not a preferred embodiment for reasons of space. The crispy composition may advantageously be distributed through orifices which direct the jets tangentially to the rotating flow of aerated composition so that the jet impinges in the opposite direction to the rotation. The annular flow of crispy composition formed by all the jets together is directed downwards at an angle of 20° to 30° relative to the horizontal.

The invention is described in more detail in the following with reference to the accompanying drawings.

DETAILED DESCRIPTION OF THE DRAWINGS

Figure 1:
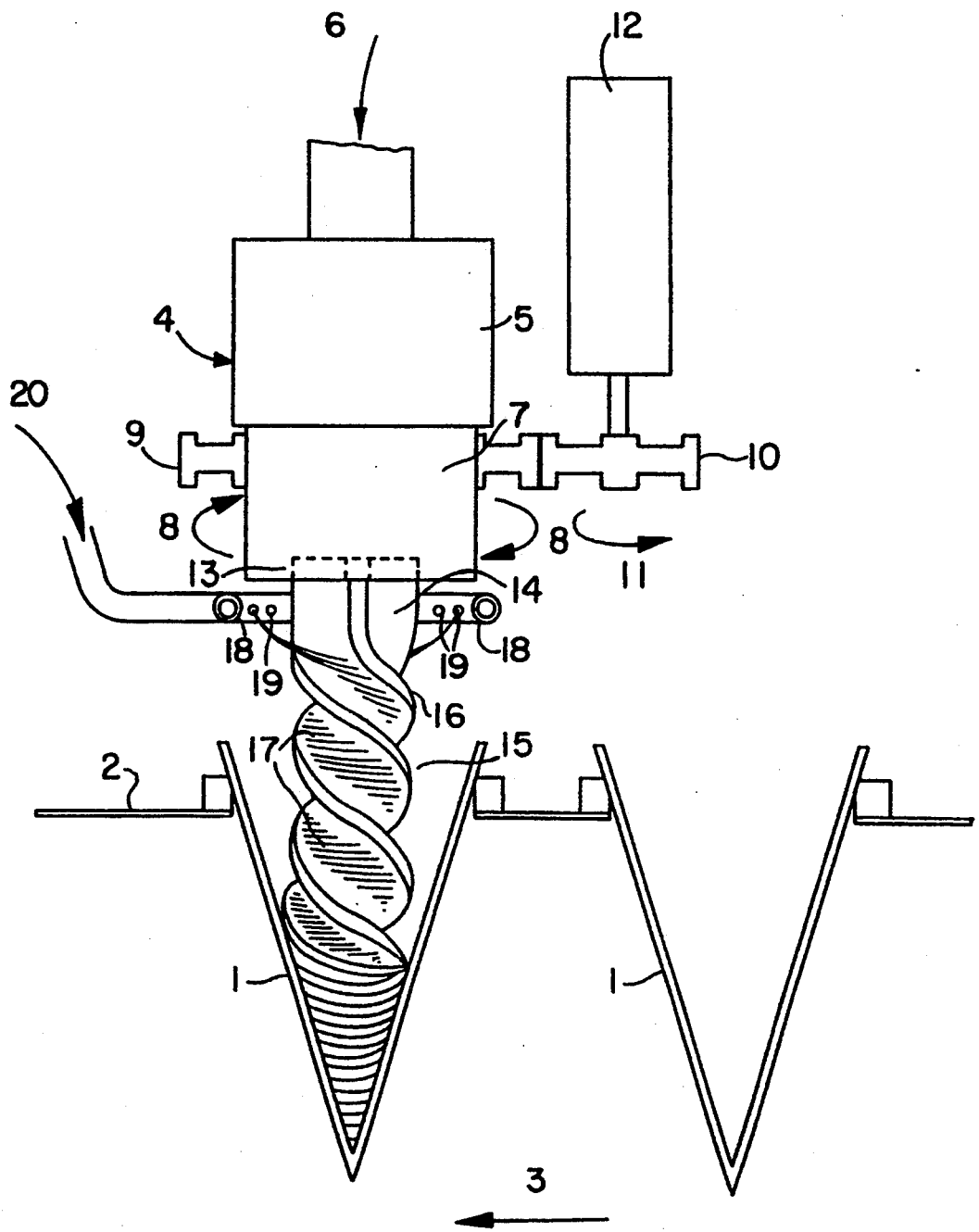
FIG. 1 schematically illustrates the apparatus during the filling step.

Referring to FIG. 1, a wafer cornet 1 already coated internally with a layer of chocolate is carried by a plate 2. The plate 2 is fixed to an endless chain circulating step-by-step in the direction 3. The chain stops beneath the filling station, the stopping time of the chain corresponding to the time required to fill a cornet. The filling station consists of a fixed upper part 5 fed with ice confectionery at 6 and a lower part 7 which rotates clockwise about its axis in the direction of the arrow(s) 8. The mobile part of the nozzle is permanently rotated by a gear 9 engaging with a gear 10 rotating in the direction of the arrow 11. The gear 10 is actuated by a pneumatic motor 12. The mobile part 7 of the nozzle terminates in a die 13 formed by a slot in the shape of a three-pointed star. The extrusion die 13 delivers a three-sided ribbon 14 which, under the effect of the rotation of the nozzle lower part 7, assumes the form of a helix 15. The helix 15 comprises a peak 16 and passages 17. The spray nozzle 18 consists of an annular tube situated just beneath the extrusion die 13 so that the ring surrounds the helix. The annular tube comprises orifices 19 disposed around the ring.

The coating of molten chocolate introduced at 20 is sprayed through the orifices 19 in the form of converging jets and the sprayed flow covers the channel-like surfaces of the passages 17 between the peaks 16. On contact with the ice confectionery, the coating hardens into flakes which become inserted between the successive layers of ice confectionery piling up in the cornet.

Figures 2, 3:
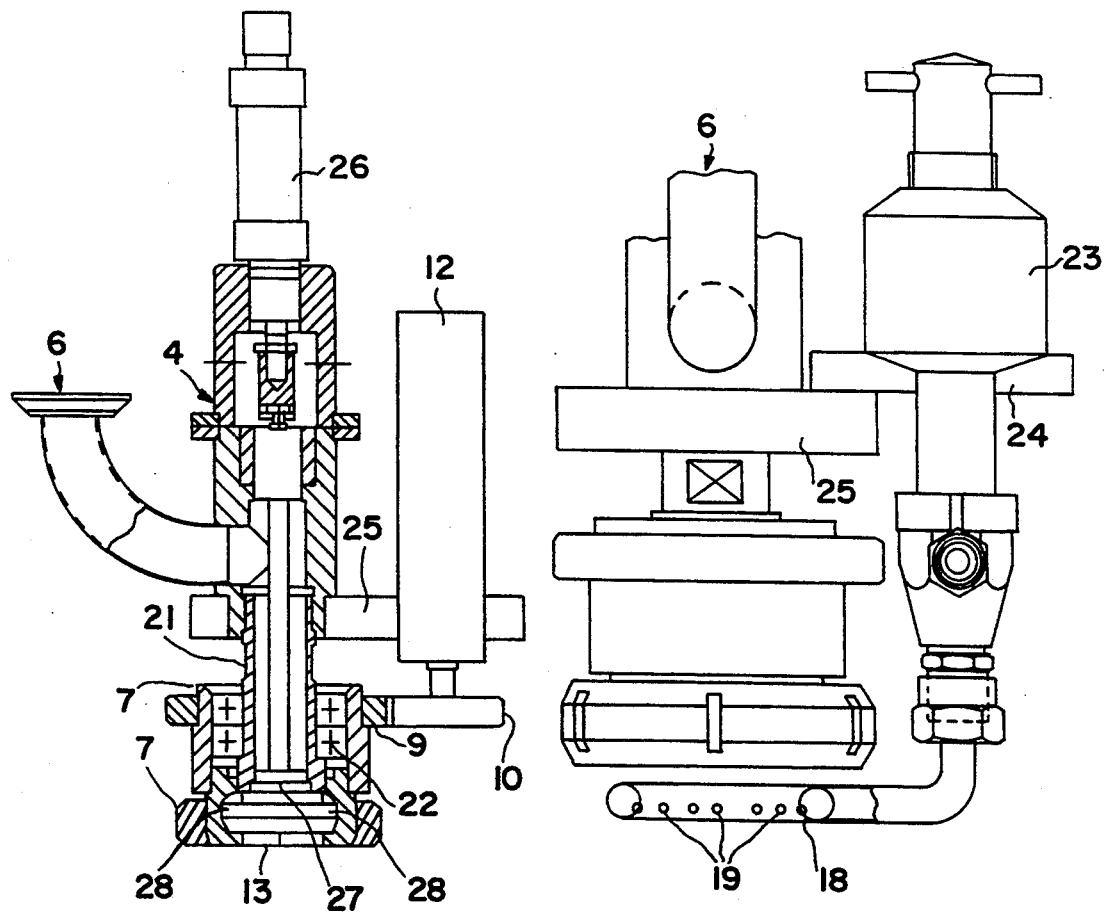
FIG. 2 is a view, partly in section, through the extrusion nozzle for aerated composition.
FIG. 3 is a view, partly in section, of part of the nozzles for extruding aerated composition and projecting crispy composition.

As shown in FIG. 2, the mobile part 7 is in the form of a ring and surrounds a fixed central boss 21 of the nozzle 4. It rotates freely about the nozzle 4 by means of ball bearings 22.

As shown in FIG. 3, the spray nozzle 18 is connected to a spray gun for spraying viscous liquid products of the so-called "low pressure" type, for example of the order of 0.1 to 1 bar in relation to atmospheric pressure. The spray gun 23 is mounted on a support plate 24 fixed to the plate 25 which carries the nozzle 4 and the motor 12.

Figure 4:
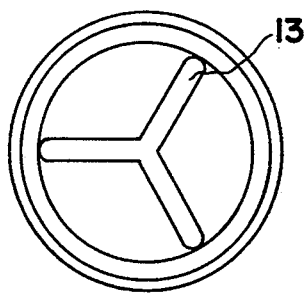
FIGS. 4, 5, 6, 7 and 8 show various extrusion dies.
Figure 5:
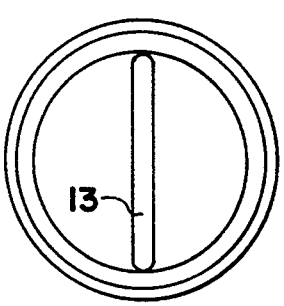
Figure 6:
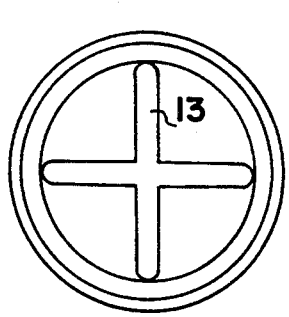
Figure 7:
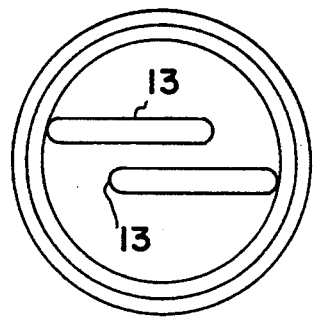
Figure 8:
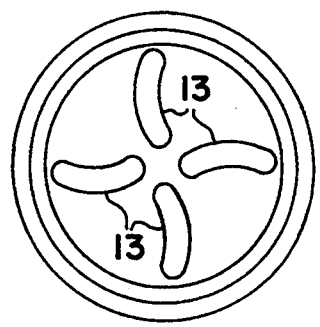

As shown in FIG. 4, the extrusion die is a slot in the shape of a star with three points symmetrical in relation to the axis of the extrusion nozzle. In FIG. 5, the extrusion die is rectangular whereas, in FIG. 6, it is cruciform. In FIG. 7, the extrusion die comprises two parallel, offset slots. In FIG. 8, the extrusion die is formed by four curved slots.

In operation of a filling cycle, a step-by-step drive system (not shown) advances an empty cornet beneath the filling station. As soon as the cornet stops, the jack 26 opens the valve 27 and releases the ice confectionery article. At the same time, the coating of hot chocolate is sprayed through the nozzle 18. When the cornet is full, the jack 26 actuates the piston valve 27 and shuts off the supply of ice confectionery. When the piston ascends, the valve—by its configuration—draws the remaining product into the lower part 28 of the nozzle which results in a clean break in the supply of ice cream without any running. At the same time, a flap (not shown) shuts off the supply of chocolate coating. The flap may be controlled by a magnetic end-of-stroke detector (not shown) for the piston of the jack 26.

The ice confectionery product is advantageously at least 90% aerated ice cream containing 5 to 10% by weight fats and 30 to 45% by weight dry matter which is extruded at a temperature of $-5°$ to $-3°$ C. The extrusion parameters are of course dependent upon the type of ice cream and, more particularly, its freezing point, the quantity of fats and the type of stabilizers present. Its consistency is the result of a compromise between a degree of fluidity which leads to correct filling of the tip of the cornet and a viscosity which provides for clean cutting during dosing.

The crispy composition is sprayed at approximately $40°$ to $45°$ C.

After the supplies have been interrupted, the chain 3 is able to advance by one step and to present another cornet to the filling station. The supply of ice cream may be controlled by a sensor for detecting stoppage of the chain.

The foregoing detailed description has been concerned with the filling of a single line of cornets. It would also be possible in accordance with the invention simultaneously to fill several lines of cornets forming rows. In the rows, the cornets may be staggered to save space.

The detailed description was concerned with a mass of ice cream with thin intermediate layers of chocolate. The mass of ice confectionery may consist of an aerated iced composition other than ice cream, for example an aerated sorbet of soft consistency.

The foregoing description has been concerned with an article in the form of an ice cream cone. The article may also be in the form of an ice lolly of circular cross-section and may comprise a holding stick at its centre. In this case, it has to be demoulded again and optionally covered with a coating layer. The article may also be in the form of a tub. In this case, the ice confectionery would be consumed, for example, with a spoon, the flaky texture providing the portions with a new taste sensation.

The foregoing description has been concerned with the filling of a single-flavour article of ice confectionery. It would also be possible in accordance with the invention, for example, to produce two-flavoured articles of ice confectionery using a suitable rotating joint.

Finally, the foregoing description has been concerned with the filling of a mould. It is possible to decorate or fill a support, for example in the form of a continuous strand of rectangular or U-shaped cross-section, with a continuously extruded, flaky helical ribbon, the whole then being cut to form a gâteau.

The foregoing description is of course also applicable to the production of a dessert article based on refrigerated mousse, for example based on aerated cream or cheese containing flakes of crispy material, for example plain chocolate, in a tub or a container.

We claim:
1. An apparatus for production of a layered extruded article comprising:
   an extrusion nozzle positioned for extruding an extrudable composition in a vertical downward direction comprising a fixed upper part, a joint member and a lower mobile part having a slot extrusion die wherein
      the fixed upper part is positioned for receiving the extrudable composition,
      the lower mobile part having the die is positioned for receiving the extrudable composition from the upper part for extruding the composition through a slot of the slot extrusion die, and
      the joint member connects the upper and lower parts so that the lower part is rotatable about a central vertical axis of the lower part so that upon rotation of the lower part and extrusion of the extrudable composition, the extruded composition has a form of a helical ribbon having a passage between helical peak flights;
   means for rotating the lower part;
   a spray nozzle positioned for spraying a sprayable composition into the passage of the helical ribbon for obtaining a sprayed, extruded composition;
   a support positioned beneath the extrusion and spray nozzles for receiving the sprayed, extruded composition; and
   means for advancing the support beneath the nozzles.
2. An apparatus according to claim 1 wherein the support comprises a plurality of molds and wherein the means for advancing the support imparts step-by-step advance to the support so that the molds are in a stationary position for receiving the sprayed, extruded compo- sition and further comprising means for interrupting extrusion of the extrudable composition upon filling a mold.

3. An apparatus according to claim 1 wherein the means for advancing the support imparts continuous advance to the support.

4. An apparatus according to claim 1 or 2 or 3 wherein the die slot has three branches symmetrical with respect to the central vertical axis.

5. An apparatus according to claim 1 or 2 or 3 wherein the spray nozzle is configured for spraying the sprayable composition downwards at an angle of from 20° to 30° with respect to a horizontal.

6. An apparatus according to claim 1 or 2 or 3 wherein the spray nozzle is in a form of a ring.

7. An apparatus according to claim 6 wherein the ring has orifices for spraying the sprayable composition downwards at an angle of from 20° to 30° with respect to a horizontal.

* * * * *